(12) United States Patent
Wang et al.

(10) Patent No.: US 10,826,870 B2
(45) Date of Patent: Nov. 3, 2020

(54) METHOD, DEVICE AND SERVER FOR PROCESSING ACCESS REQUEST

(71) Applicant: WANGSU SCIENCE & TECHNOLOGY CO., LTD., Shanghai (CN)

(72) Inventors: Kaihui Wang, Shanghai (CN); Shujia Dong, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/564,027

(22) Filed: Sep. 9, 2019

(65) Prior Publication Data
US 2020/0304461 A1   Sep. 24, 2020

Related U.S. Application Data

(63) Continuation of application No. PCT/CN2019/086048, filed on May 8, 2019.

(30) Foreign Application Priority Data

May 8, 2019   (CN) .......................... 201910219134.5

(51) Int. Cl.
*H04L 29/12*   (2006.01)
*H04L 29/06*   (2006.01)
(Continued)

(52) U.S. Cl.
CPC ........ *H04L 61/3025* (2013.01); *G06F 16/955* (2019.01); *H04L 63/0876* (2013.01); *H04L 67/02* (2013.01); *H04L 67/42* (2013.01)

(58) Field of Classification Search
CPC ............... H04L 61/3025; H04L 61/304; H04L 63/0876; H04L 63/0263; H04L 63/0823;
(Continued)

(56) References Cited

U.S. PATENT DOCUMENTS

| | | | |
|---|---|---|---|
| 2012/0079060 A1* | 3/2012 | Vijayakumar | .......... H04L 67/02 709/217 |
| 2014/0098662 A1* | 4/2014 | Jungck | ................ H04L 63/0263 370/230 |

(Continued)

FOREIGN PATENT DOCUMENTS

| | | |
|---|---|---|
| CN | 102668518 A | 9/2012 |
| CN | 104392008 A | 3/2015 |

(Continued)

OTHER PUBLICATIONS

International Search Report for International Application No. PCT/CN2019/086048 dated Jul. 17, 2019.

*Primary Examiner* — Le H Luu
(74) *Attorney, Agent, or Firm* — Heslin Rothenberg Farley & Mesiti P.C.

(57) ABSTRACT

The present disclosure relates to a network technology, and discloses a method, a device and a server for processing an access request. The method comprises: obtaining a response content corresponding to the access request from a source station according to a URL of the access request, when receiving the access request sent by a client terminal; adjusting domain names of at least two sub-resource requests in response content to be a same domain name of a preset protocol type, and returning adjusted response content to the client terminal; restoring, when receiving a sub-resource request having the same domain name, the domain name of the sub-resource request to an original domain name thereof; and obtaining a sub-resource content corresponding to the sub-resource request from the source station according to the original domain name of the sub-resource request, and returning the sub-resource content to the client terminal.

20 Claims, 7 Drawing Sheets

(51) Int. Cl.
*H04L 29/08* (2006.01)
*G06F 16/955* (2019.01)

(58) Field of Classification Search
CPC ......... H04L 63/14; H04L 67/02; H04L 67/42; H04L 67/2823; H04L 67/2847; H04L 29/06; H04L 69/329; G06F 16/955; G06F 16/95; G06Q 30/0621
See application file for complete search history.

(56) References Cited

U.S. PATENT DOCUMENTS

| | | | |
|---|---|---|---|
| 2015/0039724 A1* | 2/2015 | Blinn | G06Q 30/0621 709/219 |
| 2016/0142432 A1* | 5/2016 | Manadhata | H04L 63/14 726/25 |
| 2016/0316006 A1* | 10/2016 | Zhang | H04L 61/304 |
| 2016/0373544 A1* | 12/2016 | Souders | H04L 67/2823 |
| 2018/0032491 A1* | 2/2018 | Heo | G06F 16/95 |
| 2018/0247076 A1* | 8/2018 | Lerner | H04L 67/2847 |
| 2018/0351777 A1* | 12/2018 | Roskind | H04L 29/06 |
| 2019/0132378 A1* | 5/2019 | Perl | H04L 69/329 |
| 2019/0243924 A1* | 8/2019 | Goel | H04L 63/0823 |

FOREIGN PATENT DOCUMENTS

| | | |
|---|---|---|
| CN | 108200104 A | 6/2018 |
| WO | 2013067224 A1 | 5/2013 |

* cited by examiner

METHOD, DEVICE AND SERVER FOR PROCESSING ACCESS REQUEST

CROSS-REFERENCE TO RELATED APPLICATIONS

The present disclosure is a continuation of international application No. PCT/CN2019/086048, filed on May 8, 2019, and titled "METHOD, DEVICE AND SERVER FOR PROCESSING ACCESS REQUEST", which is incorporated herein by reference in its entirety. The PCT application claims the priority of a Chinese patent application No. 201910219134.5 filed on Mar. 21, 2019 with a title "METHOD, DEVICE and SERVER FOR PROCESSING ACCESS REQUEST", the entirety of which is incorporated herein by reference.

TECHNICAL FIELD

Embodiments of the present application relate to the field of network technologies, and in particular, to a method, a device and a server for processing an access request.

BACKGROUND

The Hypertext Transfer Protocol 2.0 (shorted as HTTP2) is a new generation HTTP protocol with properties such as a new binary format, multiplexing, header compression, server-side push, etc. For a page accessed by users, if the page includes a lot of sub-resources, a technology in HTTP2 of multiplexing a connection by multiple domain names could be used to increase a loading speed for the sub-resources, specifically, it comprises: modifying a source station, and reducing domain names of sub-resources in the pages or merging them into a same domain name; or, adopting multiple domain names and multiplexing a same HTTP2 connection for the same domain name.

The inventors have found that at least the following problems exist in the prior art: the cost for modifying the source station is high, and the speed for HTTP1 users to access the page will be affected; and when multiple domain names are adopted, the TCP connection establishment and the SSL negotiation handshake have to be performed several times and each connection has to go through a slow TCP start process, which consumes more time.

SUMMARY

The purpose of the embodiments of the application is to provide a method, a device and a server for processing an access request, which may increase an access speed of the users without user's perception; and there is no necessity to modify the source station.

In order to solve the above technical problems, the embodiments of the present application provide a method for a server to process an access request, the method comprises: obtaining a response content corresponding to the access request from a source station according to a URL of the access request, when receiving the access request sent by a client terminal; adjusting domain names of at least two sub-resource requests in the response content to be a same domain name of a preset protocol type, and returning the adjusted response content to the client terminal, wherein, the domain name of the preset protocol type is a domain name supporting multiplexing; restoring, when receiving a sub-resource request having the same domain name sent by the client terminal, the domain name of the sub-resource request to an original domain name of the sub-resource request; and obtaining a sub-resource content corresponding to the sub-resource request from the source station according to the original domain name of the sub-resource request, and returning the sub-resource content to the client terminal.

The embodiments of the present application further provide a device for a server to process an access request, the device comprises: a first obtaining module configured for obtaining a response content corresponding to the access request from a source station according to a URL of the access request, when receiving the access request sent by a client terminal; an adjusting module configured for adjusting domain names of at least two sub-resource requests in the response content to be a same domain name of a preset protocol type, and returning the adjusted response content to the client terminal, wherein, the domain name of the preset protocol type is a domain name supporting multiplexing; a restoring module configured for restoring, when receiving a sub-resource request having the same domain name sent by the client terminal, the domain name of the sub-resource request to an original domain name of the sub-resource request; and a second obtaining module configured for obtaining a sub-resource content corresponding to the sub-resource request from the source station according to the original domain name of the sub-resource request, and returning the sub-resource content to the client terminal.

The embodiments of the present application further provide a server, which comprises at least one processor; and a memory communicatively coupled to the at least one processor; wherein, the memory stores instructions executable by the at least one processor, and the instructions are executed by the at least one processor to enable the at least one processor to implement the above method for processing an access request.

As compared with the prior art, in the embodiments of the present application, the server obtains a response content corresponding to the access request from a source station according to a URL of the access request, when receiving the access request sent by a client terminal, wherein, the response content comprises a plurality of sub-resource requests; adjusts domain names of at least two sub-resources in the response content to a same domain name of a preset protocol type, and return the adjusted response content to the client terminal; when the user sends a sub-resource request having the same domain name sent by the client terminal, the server restores the domain name of the sub-resource request to the original domain name thereof; and the server obtains a sub-resource content corresponding to the sub-resource request from the source station according to the original domain name of the sub-resource request, and returns the sub-resource content to the client terminal; where, at least two sub-resource requests multiplexes the same domain name of the preset protocol type, and the domain name of the preset protocol type supports multiplexing, thus only one connection needs to be established for two sub-resource requests instead of establishing the connection several times, which accelerates responding speed to the sub-resource requests and thus increase an access speed of the users without user's perception; and there is no necessity to modify the source station.

In addition, the method further comprises performing the following steps before obtaining a response content corresponding to the access request from a source station according to a URL of the access request: determining if the access request is an access request of the preset protocol type; and if the access request is the access request of the preset protocol type, performing the step of obtaining a response content corresponding to the access request from a source station according to a URL of the access request. In this embodiment, the access speed of the users may be increased only if the access request sent by the user through the client terminal is an access request of the preset protocol type.

In addition, the method further comprises performing the following steps before obtaining a response content corresponding to the access request from a source station according to a URL of the access request: determining if a domain name of the access request is in a preset first domain name list; and if the domain name of the access request is in the preset first domain name list, performing the step of obtaining a response content corresponding to the access request from a source station according to a URL of the access request. In this embodiment, the domain name for which the access speed needs to be increased could be autonomously set.

In addition, the adjusting domain names of at least two sub-resource requests in the response content to be a same domain name of a preset protocol type further comprises: recording current URLs of the sub-resource requests, and establishing a correspondence between original URL and the current URL of each of the sub-resource requests; and the restoring, when receiving a sub-resource request having the same domain name sent by the client terminal, the domain name of the sub-resource request to an original domain name of the sub-resource request comprises: when receiving the sub-resource request sent by the client terminal, determining if the domain name of the sub-resource request is the same domain name according to the correspondence between the original URL and the current URL of the sub-resource request; and if the domain name of the sub-resource request is the same domain name, restoring the domain name of the sub-resource request to the original domain name of the sub-resource request. The present embodiment provides a specific implementation for restoring, receiving a sub-resource request having the same domain name sent by the client terminal, the domain name of the sub-resource request to the original domain name of the sub-resource request.

In addition, the adjusting domain names of at least two sub-resources in the response content to be a same domain name of a preset protocol type specifically comprises: adjusting the domain names of all the sub-resource requests in the response content to be the same domain name of the preset protocol type. In this embodiment, the domain names of all the sub-resource requests in the response content corresponding to the access request are adjusted to the same domain name of the preset protocol type, thereby the multiplexing of the same domain name is maximized, so that the response speed for all sub-resource requests is accelerated, and the access speed of the users is further increased.

In addition, the adjusting domain names of at least two sub-resources in the response content to be a same domain name of a preset protocol type specifically comprises: adjusting, according to a preset second domain name list, the domain names of the sub-resource requests in the response content and presented in the second domain name list to be the same domain name of the preset protocol type. In this embodiment, whether the sub-resource request needs to be accelerated could be selected more flexibly according to the second domain name list set by the user.

In addition, the same domain name is the same as the domain name of the access request. In this embodiment, the sub-resource requests multiplex the domain name of the access request, so that the sub-resource requests could directly multiplex the connection for the access request without re-establishing connections, thereby further increasing the access speed of the users.

In addition, the preset protocol type is a HTTP2 protocol.

BRIEF DESCRIPTION OF THE DRAWINGS

One or more embodiments are illustrated by pictures in the accompanying drawings corresponding thereto, but the illustration does not constitute a limitation to the embodiments. The elements with the same reference number in the drawings indicates like elements and the figures in the accompanying drawings do not define a scale limitation unless otherwise stated.

DETAILED DESCRIPTION

To make the objective, technical solutions, and advantages of the present disclosure clearer, the following further describes the embodiments of the present disclosure in details with reference to the drawings. Those skilled in the art would appreciate that in various embodiments of the present application, numerous technical details are set forth to provide the reader with a better understanding of the present application. However, the technical solutions claimed in the present application may be implemented without these technical details and various changes and modifications made based on the following embodiments.

A first embodiment of the present application relates to a method for a server to process an access request; the server may be a node server of a CDN network, and a client terminal of a user performs a request interaction with a source station through the server.

Figure 1:
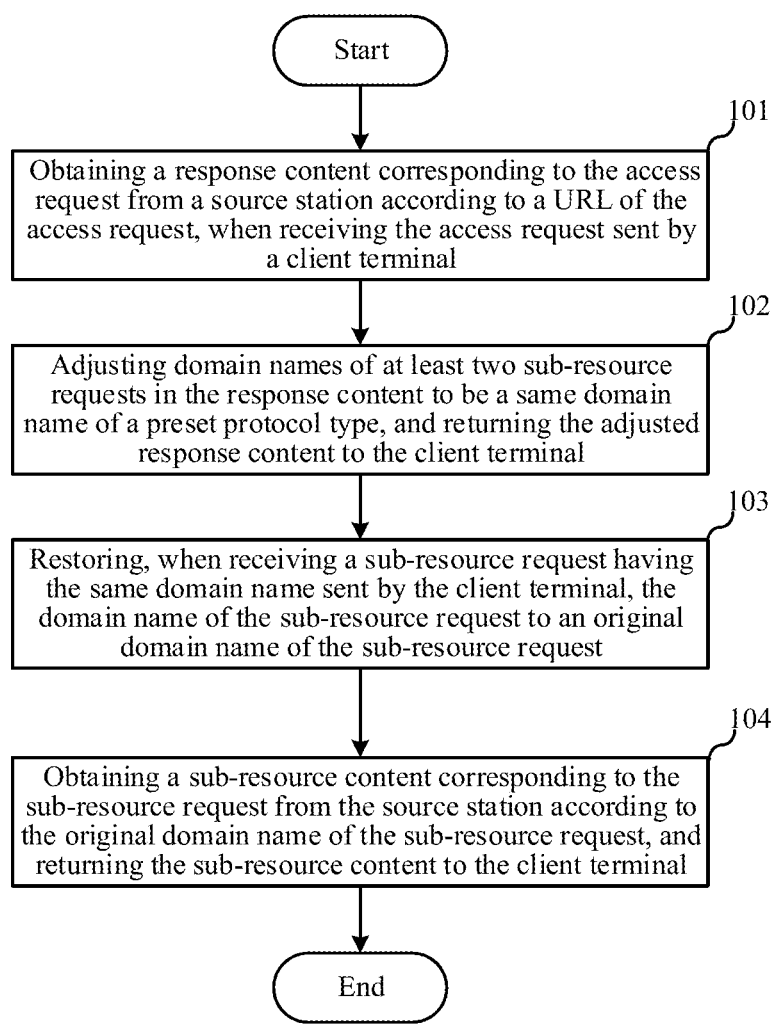
FIG. 1 is a specific flowchart illustrating a method for processing an access request according to a first embodiment of the present application.

The specific process of the method for processing an access request in this embodiment is shown in FIG. 1.

Step 101: obtaining a response content corresponding to the access request from a source station according to a URL of the access request, when receiving the access request sent by a client terminal.

Specifically, the user sends the access request to the server through the client terminal, and after receiving the access request of the user, the server obtains the response content corresponding to the access request from a source station according to the URL of the access request; for example, if the URL of the access request is "HTTPS://domain.com/request", the domain name is "domain.com" and the response content is a web page, for example.

Step 102: adjusting domain names of at least two sub-resource requests in the response content to be a same domain name of a preset protocol type, and returning the adjusted response content to the client terminal.

Specifically, the response content includes a plurality of sub-resource requests, and each of the sub-resource requests may correspond to a respective domain name. For example, if the response content includes three sub-resource requests and the URLs of the three sub-resource requests are "HTTPS://domain1.com/request", "HTTPS://domain2.com/request", and "HTTPS://domain3.com/request" respectively, the original domain names of the three sub-resource requests are "domain1.com", "domain2.com" and "domain3.com", respectively. The domain names of at least two sub-resources requests in the response content are adjusted to be the same domain name of the preset protocol type, and the response content in which the domain names of the sub-resources requests are adjusted is returned to the client terminal. The following description are made based on the previous example, the domain names of the sub-resources requests "HTTPS://domain1.com/request" and "HTTPS://domain2.com/request" are adjusted to be "domain4.com", and the URLs of the adjusted sub-resource requests are "HTTPS://domain4.com/domain1.com/request" and "HTTPS://domain4.com/domain2.com/request" respectively, where, the domain name of the preset protocol type is a domain name supporting multiplexing, and the preset protocol type may be a HTTP2 protocol.

It should be noted that, in this embodiment, the description is made based on that only one request is included for the domain name of each of the sub-resources requests, but it is not limited thereto, a plurality of requests may be included for the domain name of one sub-resource request. Taking the domain name "domain1.com" as an example, it may include three requests, which are "HTTPS://domain1.com/request 1-1", "HTTPS://domain1.com/request 1-2", "HTTPS://domain1. Com/request 1-3", respectively.

Step 103: restoring, when receiving a sub-resource request having the same domain name sent by the client terminal, the domain name of the sub-resource request to an original domain name of the sub-resource request.

Specifically, the client terminal receives from the server the response content in which the domain names of the sub-resource requests are adjusted, and the user sends a sub-resource request having the adjusted domain name to the server through the client terminal, and the server restores the domain name of the sub-resource request from the adjusted same domain to the original domain name of the sub-resource request. For example, the client terminal sends a sub-resource request "HTTPS://domain4.com/domain1.com/request" to the server and establishes a connection with the server, and the server restores the domain name of the sub-resource request "domain4.com" to "domain1.com", and the original URL of the sub-resource request "HTTPS://domain1.com/request" is thus obtained. When the client terminal sends a sub-resource request "HTTPS://domain4.com/domain2.com/" to the server, the server may multiplex the previously established connection without re-establishing a connection, and directly restore the domain name of the sub-resource request from "domain4.com" to "domain2.com", and the original URL of the sub-resource request "HTTPS://domain2.com/request" is obtained.

Step 104: obtaining a sub-resource content corresponding to the sub-resource request from the source station according to the original domain name of the sub-resource request, and returning the sub-resource content to the client terminal.

Specifically, after the domain name of the sub-resource request are restored to its original domain, the original URL of the sub-resource request may be obtained, so that sub-resource content corresponding to the sub-resource request may be obtained from the source station according to the original URL, and the sub-resource content is returned to the client terminal.

As compared with the prior art, in the present embodiments, the server obtains a response content corresponding to the access request from a source station according to a URL of the access request, when receiving the access request sent by a client terminal, wherein, the response content comprises a plurality of sub-resource requests; adjusts domain names of at least two sub-resources in the response content to a same domain name of a preset protocol type, and return the adjusted response content to the client terminal; when the user sends a sub-resource request having the same domain name to the server with the client terminal, the server restores the domain name of the sub-resource request to the original domain name thereof; and the server obtains a sub-resource content corresponding to the sub-resource request from the source station according to the original domain name of the sub-resource request, and returns the sub-resource content to the client terminal; where, at least two sub-resource requests multiplexes the same domain name of the preset protocol type, and the domain name of the preset protocol type supports multiplexing, thus only one connection needs to be established for two sub-resource requests instead of establishing the connection several times, which accelerates responding speed to the sub-resource requests and thus increase an access speed of the users without user's perception; and there is no necessity to modify the source station.

The second embodiment of the present application relates to a method for processing an access request. The second embodiment relates to a technical solution improved based on the technical solution of the first embodiment, and the main improvement is that the determination on whether the access request is an access request of the preset protocol type is added in the present embodiment.

Figure 2:
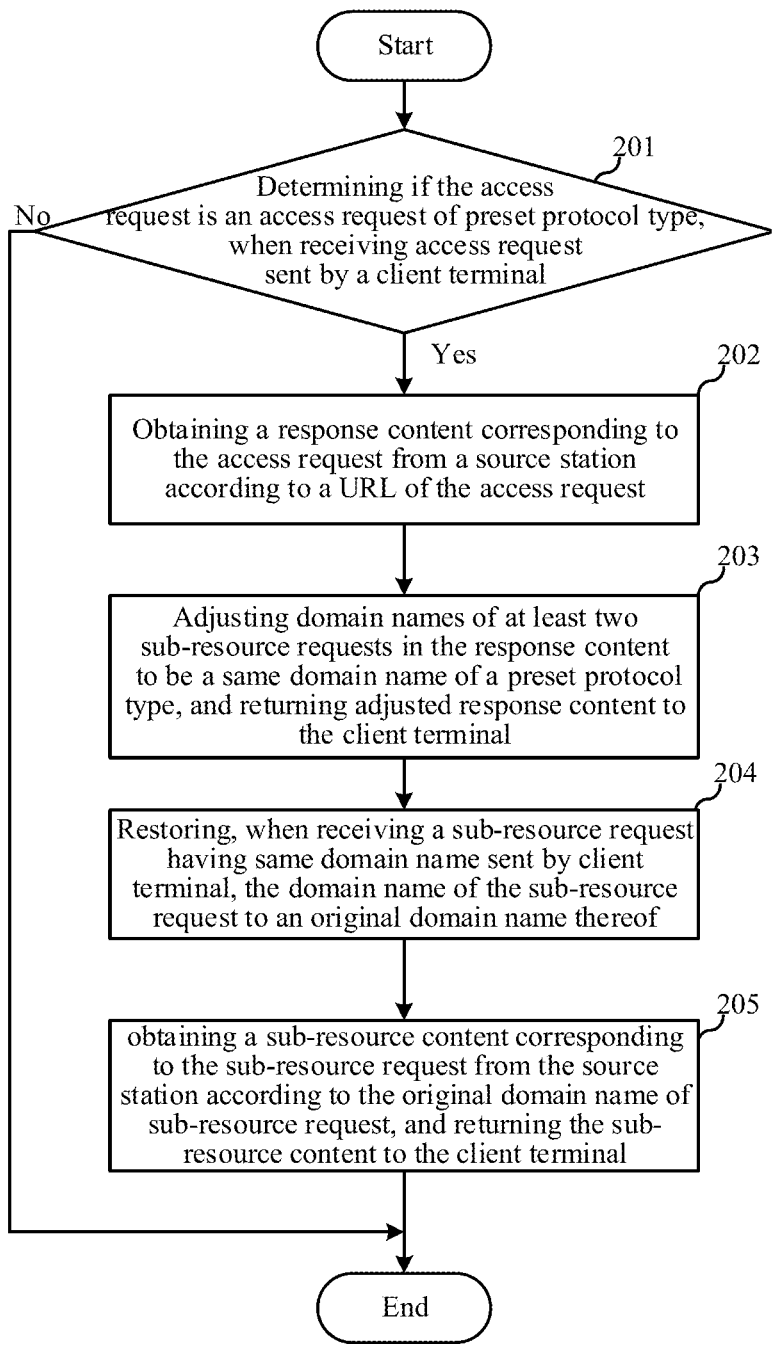
FIG. 2 is a specific flowchart illustrating a method for processing an access request according to a second embodiment of the present application.

The specific process of the method for processing an access request in this embodiment is shown in FIG. 2.

The steps 204 and 205 are substantially the same as the steps 103 and 104, which are not described herein. The main differences lie in the steps 201 to 203, which are described as follows:

Step 201: determining if the access request is an access request of the preset protocol type, when receiving the access request sent by the client terminal. If yes, the process proceeds to step 202; if no, the process ends directly.

Specifically, the user sends an access request to the server through the client terminal, and after receiving the access request of the user, the server determines if the access request is an access request of the preset protocol type, that is, the server determines if the access request is an access request supporting multiplexing. If yes, it indicates that the access request supports multiplexing, and then the process proceeds to step 202; otherwise, it indicates that the access request does not support multiplexing, and the process ends directly.

Step 202: obtaining a response content corresponding to the access request from a source station according to a URL of the access request.

Specifically, the server obtains a response content corresponding to the access request from the source station according to the URL of the access request; for example, if the URL of the access request is "HTTPS://domain.com/ request", the domain name is "domain.com" and the response content is a web page, for example.

Step 203: adjusting the domain names of at least two sub-resource requests in the response content to be a same domain name of a preset protocol type, and returning the adjusted response content to the client terminal.

Specifically, the response content includes a plurality of sub-resource requests, each sub-resource request may correspond to a respective domain name, and the server parses the response content to obtain the domain names of respective sub-resource requests. For example, if the response content includes three sub-resource requests and the URLs of the three sub-resource requests are "HTTPS://domain1.com/request", "HTTPS://domain2.com/request", and "HTTPS://domain3.com/request" respectively, the original domain names of the three sub-resource requests are "domain1.com", "domain2.com" and "domain3.com" respectively. The domain names of at least two sub-resources requests in the response content are adjusted to be the same domain name of the preset protocol type, and the response content in which the domain names of the sub-resources requests are adjusted is returned to the client terminal. The following description are made based on the previous example, the domain names of the sub-resources requests "HTTPS://domain1.com/request" and "HTTPS://domain2.com/request" are adjusted to be "domain4.com", and the URLs of the adjusted sub-resource requests are "HTTPS://domain4.com/domain1.com/request" and "HTTPS://domain4.com/domain2.com/request" respectively, where, the domain name of the preset protocol type is a domain name supporting multiplexing, and the preset protocol type may be a HTTP2 protocol.

In an example, since the access request is an access request of the preset protocol type, the domain names of the at least two sub-resource requests in the response content may be adjusted to be the same as the domain name of the access request, that is, the domain names of the sub-resource requests "HTTPS://domain1.com/request" and "HTTPS://domain2.com/request" are adjusted to be "domain.com", and the URLs of the adjusted sub-resource requests are "HTTPS://domain.com/domain1.com/request" and "HTTPS://domain.com/domain2.com/request" respectively; and the sub-resource requests multiplex the domain name of the access request, so that the sub-resource requests may directly multiplex the connection for the access request without re-establishing connections, thereby further increasing the access speed of the users.

Compared with the first embodiment, the access speed of the users is increased only when the access request sent by the user through the client terminal is an access request of the preset protocol type.

The third embodiment of the present application relates to a method for processing an access request. The third embodiment relates to a technical solution improved based on the technical solution of the first embodiment, and the main improvement is that in the present embodiment, the method may autonomously set domain names for which the access speed needs to be increased.

Figure 3:
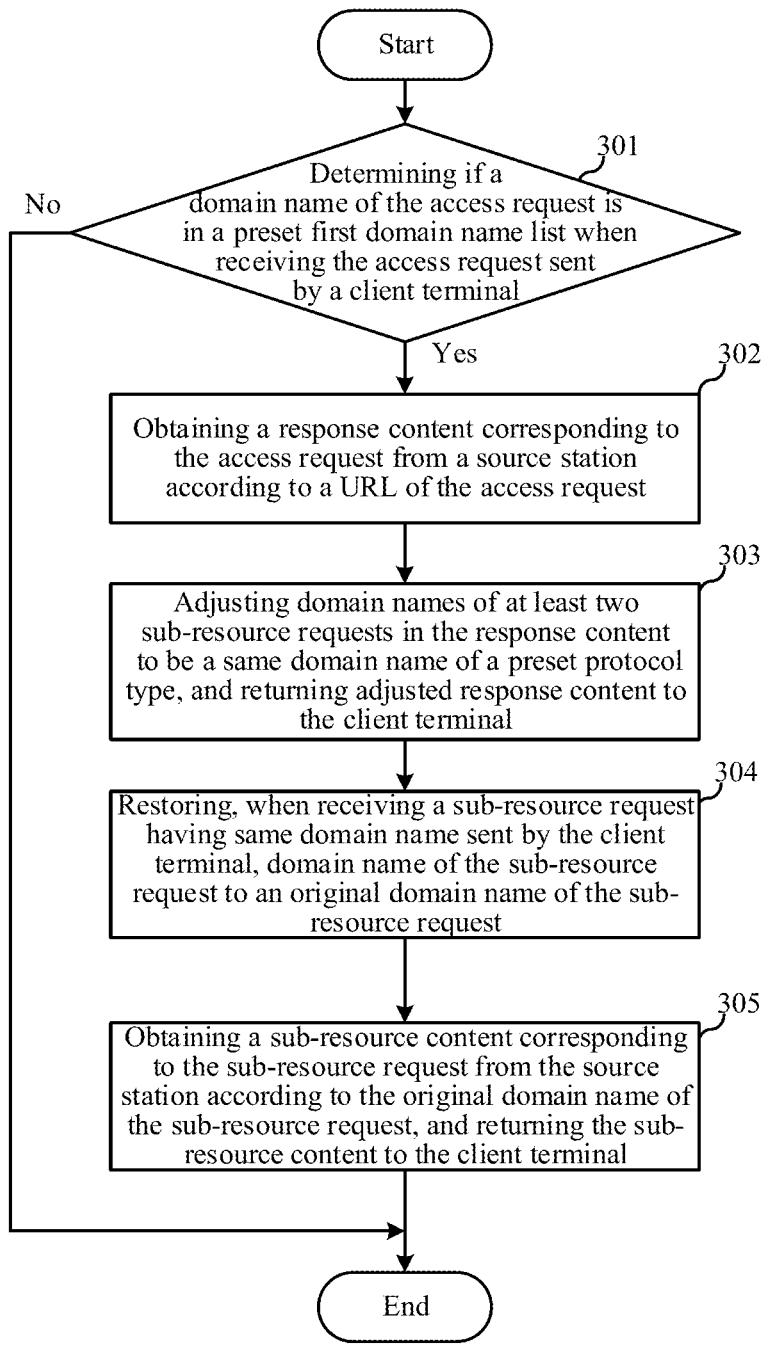
FIG. 3 is a specific flowchart illustrating a method for processing an access request according to a third embodiment of the present application.

The specific process of the method of processing the access request in this embodiment is shown in FIG. 3.

The steps 303 to 305 are substantially the same as the steps 102 to 104, which are not described herein. The main difference lies in the steps 301 and 302, which are shown as follows:

Step 301, when receiving the access request sent by the client terminal, determining if the URL of the access request is in a preset first domain name list; if yes, the process proceeds to step 302; otherwise, the process ends directly.

Specifically, the first domain name list is set in the server in advance; the user sends an access request to the server through the client terminal; and after receiving the access request of the user, the server determines if the domain name of the access request is in the preset first domain name list. If yes, the process proceeds to step 302; otherwise, the response content corresponding to the access request is obtained from the source station according to the URL of the access request, and the response content is returned to the client terminal.

Step 302: obtaining a response content corresponding to the access request from a source station according to a URL of the access request.

Specifically, the server obtains the response content corresponding to the access request from the source station according to the URL of the access request; for example, if the URL of the access request is "HTTPS://domain.com/request", the domain name is "domain.com" and the response content is a web page, for example.

Compared with the first embodiment, the present embodiment could independently set a domain name for which the access speed needs to be increased. It should be noted that the present embodiment may also be used as an improvement on the basis of the second embodiment, and the same technical effects may be achieved.

The fourth embodiment of the present application relates to a method for processing an access request. This embodiment relates to a refinement made based on the first embodiment, and the main refinement is that the present embodiment provides an implementation for restoring, when receiving a sub-resource request of the same domain name sent by the client terminal, the domain name of the sub-resource request to the original domain name thereof.

Figure 4:
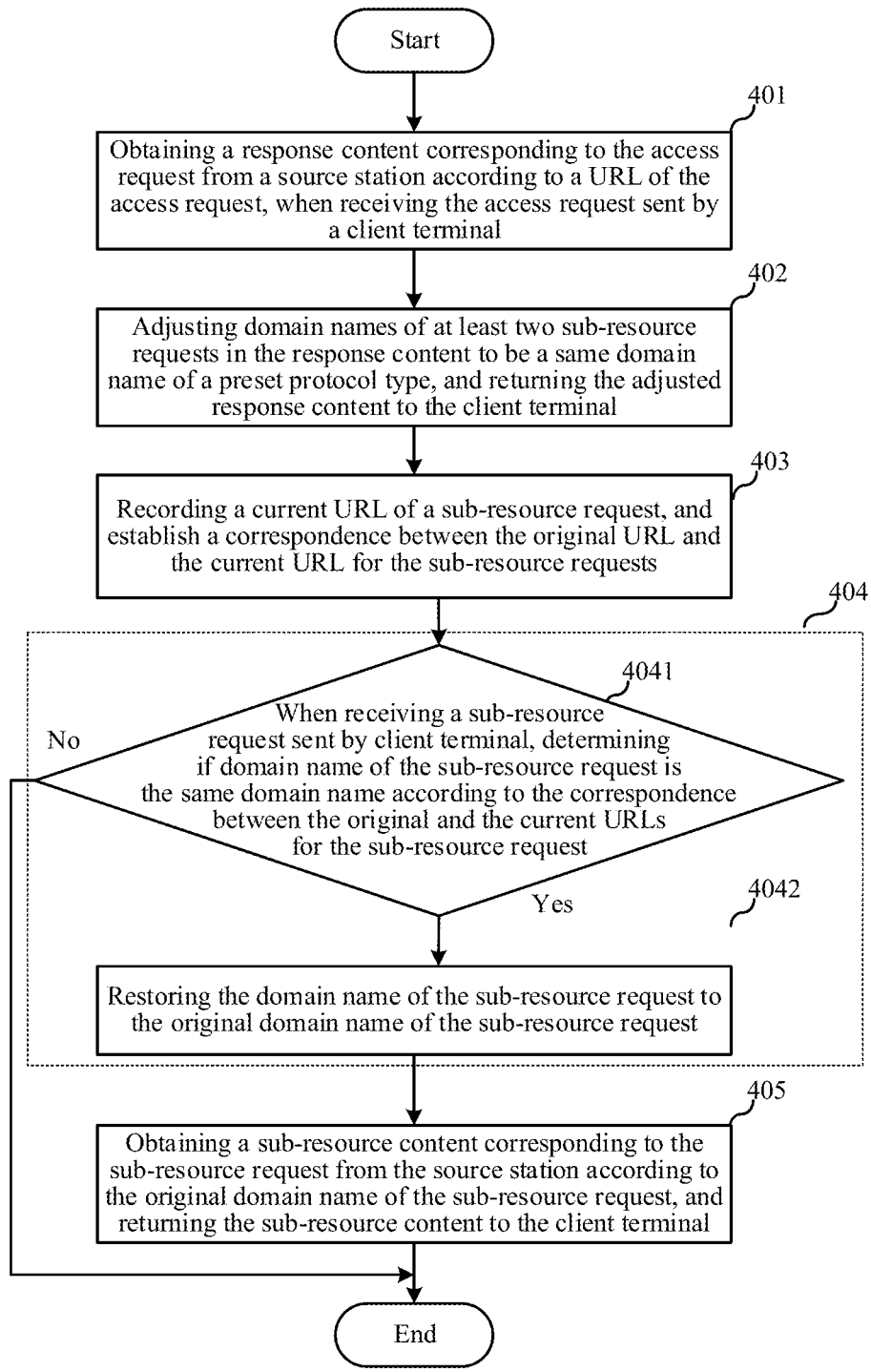
FIG. 4 is a specific flowchart illustrating a method for processing an access request according to a fourth embodiment of the present application.

The specific process of the method for processing an access request in this embodiment is shown in FIG. 4.

The steps 401, 402, and 405 are substantially the same as the steps 101, 102, and 104, which are not described herein. The main differences are as follows:

Step 403: recording a current URL of a sub-resource request, and establish a correspondence between the original URL and the current URL of each of the sub-resource requests.

Specifically, after the server adjusts the domain names of the at least two sub-resources in the response content to be the same domain name of the preset protocol type, the server obtains the URLs of the respective sub-resource requests with adjusted domain names, and the URLs of respective sub-resource requests with adjusted domain names are "HTTPS://domain4.com/domain1.com/request" and "HTTPS://domain4.com/domain2.com/request" respectively, then the server records the current URLs of respective sub-resource requests, and establish a correspondence between the original URL and the current URL of each of the sub-resource requests, that is, associating the current URL "HTTPS://domain4.com/domain1.com/request" of the sub-resource request with its original URL "HTTPS://domain1.com/request", and associating the current URL "HTTPS://domain4.com/domain2.com/request" of the sub-resource request with its original URL "HTTPS://domain2.com/request".

Step 404, which comprises the following sub-steps:
Sub-step 4041, determining, when receiving a sub-resource request sent by the client terminal, if the domain name of the sub-resource is the same domain name according to the correspondence between the original URL and the current URL of the sub-resource request. If the domain name of the sub-resource is the same domain name, the process proceeds to sub-step 4042; otherwise, the process ends directly.

Specifically, the user sends the sub-resource requests with the adjusted domain names to the server by the client terminal, and determines if a sub-resource request has a corresponding original URL according to the correspondence between the original URL and the current URL of the sub-resource request. If the sub-resource request has a corresponding original URL, it indicates that the domain name of the sub-resource request is the same domain name, that is, the domain name of the sub-resource request has been adjusted previously, and the process proceeds to sub-step 4042; otherwise, it indicates that the domain name of the sub-resource request has not been modified previously, and the process proceeds to a step of obtaining a sub-resource content corresponding to the sub-resource request from the source station directly according to the URL of the sub-resource request, and returning the sub-resource content to the client terminal.

Sub-step 4042, restoring the domain name of the sub-resource request to the original domain name thereof.

Specifically, the server restores the domain name of the sub-resource request from the adjusted same domain name to the original domain name of the sub-resource request. For example, the client terminal sends a sub-resource request "HTTPS://domain4.com/domain1.com/request" to the server, the client terminal establishes a connection with the server, and the server restores the domain name of the sub-resource request from "domain4.com" to "domain1.com" and obtains the original URL "HTTPS://domain1.com/request" of the sub-resource request; and when the client terminal sends a sub-resource request "HTTPS://domain4.com/domain2.com/request" to the server, the server may multiplex the previously established connection without re-establishing the connection, and directly restore the domain name of the sub-resource from "domain4.com" to "domain2.com" to obtain the original URL "HTTPS://domain2.com/request" of the sub-resource request.

Compared with the first embodiment, the present embodiment provides a specific implementation of restoring, when receiving a sub-resource request of the same domain name sent by the client terminal, the domain name of the sub-resource request to the original domain name of the sub-resource request. It should be noted that the present embodiment may also be used as an improvement on the basis of the second or third embodiment, and the same technical effects could also be achieved.

The fifth embodiment of the present application relates to a method for processing an access request, and the embodiment is a refinement made based on the first embodiment, and the main refinement is that the present embodiment provides implementations for adjusting domain names of at least two sub-resources in the response content to be a same domain name of a preset protocol type.

Figure 5:
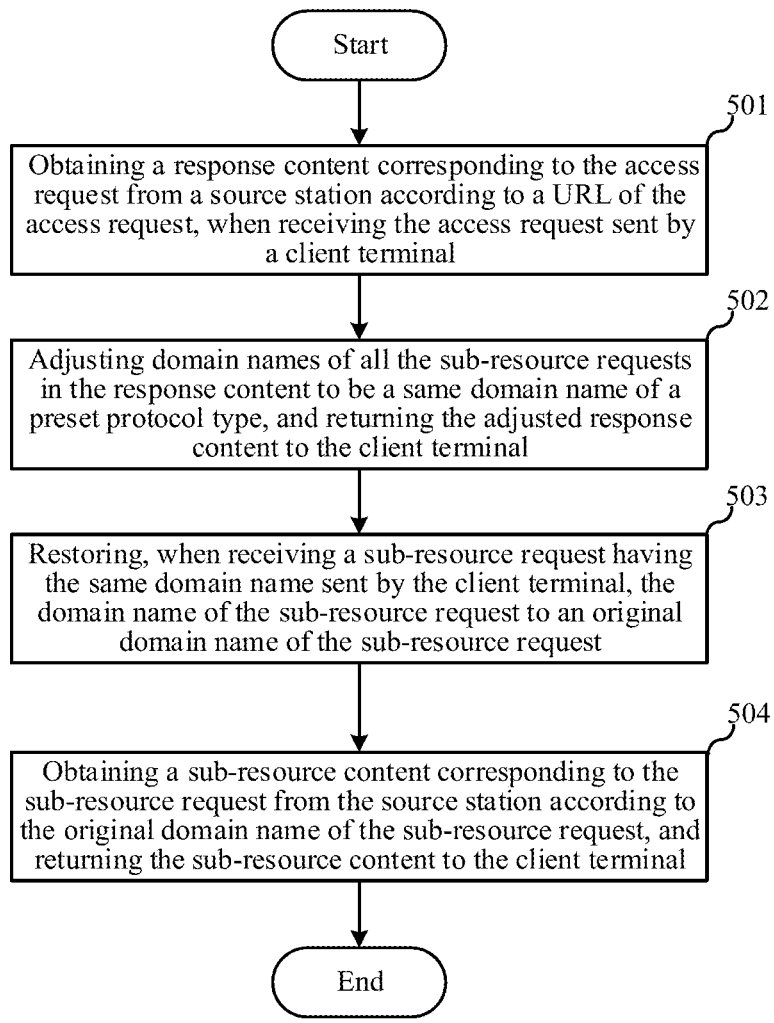
FIG. 5 and FIG. 6 are specific flowcharts illustrating a method for processing an access request according to a fifth embodiment of the present application.

This embodiment provides two implementations for adjusting the domain names of the at least two sub-resource requests in the response content to be the same domain name of the preset protocol type, as follows:

In the first implementation, the domain names of all the sub-resource requests in the response content are adjusted to be the same domain name of the preset protocol type. The specific process of the method for processing the access request in this implementation is shown in FIG. 5.

The steps 501, 503 and 504 are substantially the same as the steps 101, 103 and 104, which are not described herein. The main differences are as follows:

Step 502: adjusting the domain names of all the sub-resource requests contained in the response content to be the same domain name of the preset protocol type, and returning the adjusted response content to the client terminal.

Specifically, the response content includes a plurality of sub-resource requests, each sub-resource request may correspond to a respective domain name, and the server parses the response content to obtain the domain names of respective sub-resource requests. For example, if the response content includes three sub-resource requests and the URLs of the three sub-resource requests are "HTTPS://domain1.com/request", "HTTPS://domain2.com/request", and "HTTPS://domain3.com/request" respectively, the original domain names of the three sub-resource requests are "domain1.com", "domain2.com" and "domain3.com", respectively. The domain names of all the sub-resources requests in the response content are adjusted to be the same domain name of the preset protocol type, and the response content in which the domain names of the sub-resources requests are adjusted is returned to the client terminal. Specifically, the domain names of the sub-resources requests "HTTPS://domain1.com/request", "HTTPS://domain2.com/request" and "HTTPS://domain3.com/request" are all adjusted to be "domain4.com", and the URLs of the adjusted sub-resource requests are "HTTPS://domain4.com/domain1.com/request", "HTTPS://domain4.com/domain2.com/request" and "HTTPS://domain4.com/domain3.com/request" respectively, where, the domain name of the preset protocol type is a domain name supporting multiplexing, and the preset protocol type may be a HTTP2 protocol. In this embodiment, the domain names of all the sub-resource requests in the response content corresponding to the access request are adjusted to the same domain name of the preset protocol type, thereby the multiplexing of the same domain name is maximized, so that the response speed for all the sub-resource requests is accelerated, and the access speed of the users is further increased.

Figure 6:
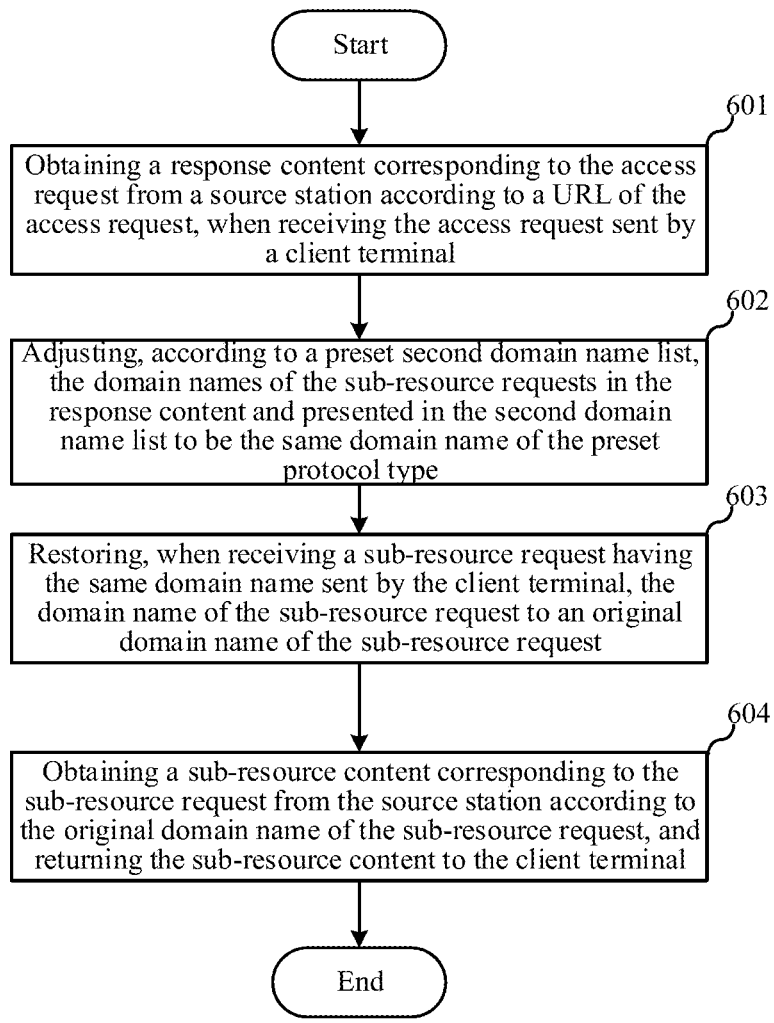

In the second implementation, the domain names of the sub-resource requests in the response content and presented in a second domain name list are adjusted to be the same domain name of the preset protocol type, according to the preset second domain name list. The specific process of the method for processing an access request is shown in FIG. 6.

The steps 601, 603 and 604 are substantially the same as the steps 101, 103 and 104, which are not described herein. The main differences are as follows:

Step 602: adjusting, according to a preset second domain name list, the domain names of the sub-resource requests in the response content and presented in the second domain name list to be the same domain name of the preset protocol type, and return the adjusted response content to the client terminal.

Specifically, the response content includes a plurality of sub-resource requests, each sub-resource request may correspond to a respective domain name, and the server parses the response content to obtain the domain names of respective sub-resource request. For example, if the response content includes three sub-resource requests and the URLs of the three sub-resource requests are "HTTPS://domain1.com/request", "HTTPS://domain2.com/request", and "HTTPS://domain3.com/request" respectively, the original domain names of the three sub-resource requests are "domain1.com", "domain2.com" and "domain3.com", respectively. The second domain name list may be preset in the server, and it is determined if the domain name of each of the sub-resource requests in the response content is in the second domain name list. If it is determined that a domain name of a sub-resource request is in the second domain name list, the domain name of the sub-resource request is adjusted to the same domain name of the preset protocol type, and the response content in which the domain names of the sub-resource requests are adjusted is returned to the client terminal. For example, if the second domain name list includes two domain names "domain1.com" and "domain3.com", the domain names of the sub-resource requests "HTTPS://domain1.com/request" and "HTTPS://domain3.com/request" are adjusted to be "domain4.com", and the URLs of the adjusted sub-resource requests are "HTTPS://domain4.com/domain1.com/request" and "HTTPS://domain4.com/domain3.com/request" respectively, where, the domain name of the preset protocol type is a domain name supporting multiplexing, and the preset protocol type may be a HTTP2 protocol. In this embodiment, whether the sub-resource request needs to be accelerated could be selected more flexibly according to the second domain name list set by the user.

As compared with the first embodiment, the present embodiment provides a specific implementation for adjusting the domain names of the at least two sub-resource requests in the response content to be the same domain name of the preset protocol type.

Figure 7:
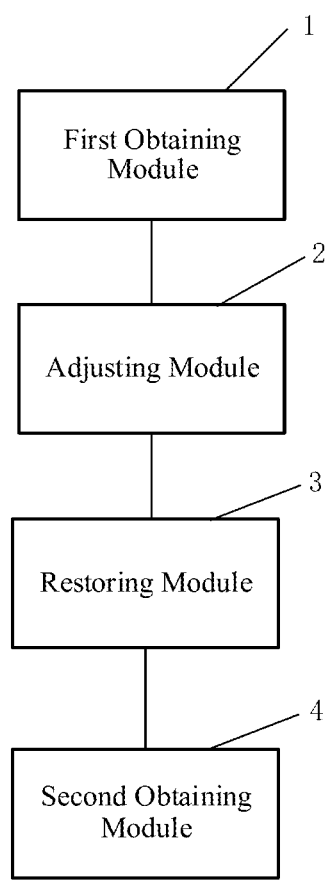
FIG. 7 is a schematic block diagram illustrating an apparatus for processing an access request according to a sixth embodiment of the present application.

The sixth embodiment of the present application relates to a device for a server to process an access request, the server may be a node server for a CDN network, and a client terminal of a user performs a request interaction with a source station through the server. As shown in FIG. 7, the device for processing accessing an request includes:

a first obtaining module 1 configured for obtaining a response content corresponding to the access request from a source station according to a URL of the access request, when receiving the access request sent by a client terminal;

an adjusting module 2 configured for adjusting domain names of at least two sub-resource requests in the response content to be a same domain name of a preset protocol type, and returning the adjusted response content to the client terminal, wherein, the domain name of the preset protocol type is a domain name supporting multiplexing;

a restoring module 3 configured for restoring, when receiving a sub-resource request having the same domain name sent by the client terminal, the domain name of the sub-resource request to an original domain name of the sub-resource request; and a second obtaining module 4 configured for obtaining a sub-resource content corresponding to the sub-resource request from the source station according to the original domain name of the sub-resource request, and returning the sub-resource content to the client terminal.

Since the first to fifth embodiments correspond to the present embodiment, the present embodiment could be implemented in combination with the first to fifth embodiments. The related technical details mentioned in the first to fifth embodiments are effective in the present embodiment, and the technical effects that could be obtained in the first to fifth embodiments could also be obtained in the present embodiment. In order to avoid repetition, detailed description is omitted herein. Accordingly, the related technical details mentioned in this embodiment could also be applied to the first to fifth embodiments.

As compared with the prior art, in the present embodiments, the server obtains a response content corresponding to the access request from a source station according to a URL of the access request, when receiving the access request with a client terminal, wherein, the response content comprises a plurality of sub-resource requests; adjusts domain names of at least two sub-resources in the response content to a same domain name of a preset protocol type, and return the adjusted response content to the client terminal; when the user sends a sub-resource request having the same domain name sent by the client terminal, the server restores the domain name of the sub-resource request to the original domain name thereof; and the server obtains a sub-resource content corresponding to the sub-resource request from the source station according to the original domain name of the sub-resource request, and returns the sub-resource content to the client terminal; where, at least two sub-resource requests multiplexes the same domain name of the preset protocol type, and the domain name of the preset protocol type supports multiplexing, thus only one connection needs to be established for two sub-resource requests instead of establishing the connection several times, which accelerates responding speed to the sub-resource requests and thus increase an access speed of the users without user's perception; and there is no necessity to modify the source station.

A seventh embodiment of the present application relates to a server, the server may be a node server for a CDN network, and a client terminal of a user performs a request interaction with a source station through the server. The server includes at least one processor; and a memory communicatively coupled to the at least one processor; wherein the memory stores instructions executable by the at least one processor, and the instructions are executed by the at least one processor to enable the at least one processor to execute the method for processing an access request according to any one of the first to fifth embodiments.

The memory and the processor are connected through a bus, the bus may include any number of interconnected buses and bridges, and the bus connects various circuits of one or more processors and memories. The bus may also connect various other circuits, such as peripheral devices, voltage regulators, and power management circuits, all of which are well known in the art and thus will not be further described herein. The bus interface provides an interface between the bus and the transceiver. The transceiver could be an element or a plurality of elements, such as a plurality of receivers and transmitters, which provides units for communicating with various other devices over transmission media. Data processed by the processor is transmitted over the wireless medium via an antenna. Further, the antenna also receives data and transmits the data to the processor.

The processor is configured for managing the bus and normal processing, and it may also provide various functions including timing, peripheral interfaces, voltage regulation, power management, and other control functions. The memory may be used to store data used by the processor when performing operations.

Those skilled in the art can understand that the above embodiments are specific embodiments for implementing the present application, and in actual application, various changes could be made in form and in details without departing from the spirit and scope of the present application.

What is claimed is:

1. A method for a server to process an access request, comprising steps of:

obtaining a response content corresponding to the access request from a source station according to a URL of the access request, when receiving the access request sent by a client terminal;

adjusting domain names of at least two sub-resource requests in the response content to be a same domain name of a preset protocol type, and returning the adjusted response content to the client terminal, wherein, the domain name of the preset protocol type is a domain name supporting multiplexing;

restoring, when receiving a sub-resource request having the same domain name sent by the client terminal, the domain name of the sub-resource request to an original domain name of the sub-resource request; and obtaining a sub-resource content corresponding to the sub-resource request from the source station according to the original domain name of the sub-resource request, and returning the sub-resource content to the client terminal.

2. The method for processing an access request according to claim 1, further comprising performing the following steps before obtaining a response content corresponding to the access request from a source station according to a URL of the access request:

determining if the access request is an access request of the preset protocol type; and if the access request is the access request of the preset protocol type, performing the step of obtaining a response content corresponding to the access request from a source station according to a URL of the access request.

3. The method for processing an access request according to claim 2, wherein the same domain name is the same as the domain name of the access request.

4. The method for processing an access request according to claim 2, wherein the preset protocol type is a HTTP2 protocol.

5. The method for processing an access request according to claim 2, further comprising performing the following steps before obtaining a response content corresponding to the access request from a source station according to a URL of the access request:

determining if a domain name of the access request is in a preset first domain name list; and if the domain name of the access request is in the preset first domain name list, performing the step of obtaining a response content corresponding to the access request from a source station according to a URL of the access request.

6. The method for processing an access request according to claim 1, further comprising performing the following steps before obtaining a response content corresponding to the access request from a source station according to a URL of the access request:

determining if a domain name of the access request is in a preset first domain name list; and if the domain name of the access request is in the preset first domain name list, performing the step of obtaining a response content corresponding to the access request from a source station according to a URL of the access request.

7. The method for processing an access request according to claim 1, wherein, the adjusting domain names of at least two sub-resource requests in the response content to be a same domain name of a preset protocol type further comprises:
recording current URLs of the sub-resource requests, and establishing a correspondence between original URL and the current URL of each of the sub-resource requests; and the restoring, when receiving a sub-resource request having the same domain name sent by the client terminal, the domain name of the sub-resource request to an original domain name of the sub-resource request comprises:

when receiving the sub-resource request sent by the client terminal, determining if the domain name of the sub-resource request is the same domain name according to the correspondence between the original URL and the current URL of the sub-resource request; and if the domain name of the sub-resource request is the same domain name, restoring the domain name of the sub-resource request to the original domain name of the sub-resource request.

8. The method for processing an access request according to claim 1, wherein the adjusting domain names of at least two sub-resources in the response content to be a same domain name of a preset protocol type comprises:

adjusting the domain names of all the sub-resource requests in the response content to be the same domain name of the preset protocol type.

9. The method for processing an access request according to claim 1, wherein the adjusting domain names of at least two sub-resources in the response content to be a same domain name of a preset protocol type comprises:

adjusting, according to a preset second domain name list, the domain names of the sub-resource requests in the response content and presented in the second domain name list to be the same domain name of the preset protocol type.

10. The method for processing an access request according to claim 1, wherein the preset protocol type is a HTTP2 protocol.

11. A device for a server to process an access request, comprising:

a first obtaining module configured for obtaining a response content corresponding to the access request from a source station according to a URL of the access request, when receiving the access request sent by a client terminal;

an adjusting module configured for adjusting domain names of at least two sub-resource requests in the response content to be a same domain name of a preset protocol type, and returning the adjusted response content to the client terminal, wherein, the domain name of the preset protocol type is a domain name supporting multiplexing;

a restoring module configured for restoring, when receiving a sub-resource request having the same domain name sent by the client terminal, the domain name of the sub-resource request to an original domain name of the sub-resource request; and a second obtaining module configured for obtaining a sub-resource content corresponding to the sub-resource request from the source station according to the original domain name of the sub-resource request, and returning the sub-resource content to the client terminal.

12. A server, comprising at least one processor and a memory communicatively coupled to the at least one processor; wherein the memory stores instructions executable by the at least one processor, and the instructions are executed by the at least one processor to enable the at least one processor to implement a method for processing an access request, the method comprising steps of:
- obtaining a response content corresponding to the access request from a source station according to a URL of the access request, when receiving the access request sent by a client terminal;
- adjusting domain names of at least two sub-resource requests in the response content to be a same domain name of a preset protocol type, and returning the adjusted response content to the client terminal, wherein, the domain name of the preset protocol type is a domain name supporting multiplexing;
- restoring, when receiving a sub-resource request having the same domain name sent by the client terminal, the domain name of the sub-resource request to an original domain name of the sub-resource request; and
- obtaining a sub-resource content corresponding to the sub-resource request from the source station according to the original domain name of the sub-resource request, and returning the sub-resource content to the client terminal.

13. The server according to claim 12, wherein, the at least one processor further implement the following steps before obtaining a response content corresponding to the access request from a source station according to a URL of the access request:
- determining if the access request is an access request of the preset protocol type; and
- if the access request is the access request of the preset protocol type, performing the step of obtaining a response content corresponding to the access request from a source station according to a URL of the access request.

14. The server according to claim 13, wherein the same domain name is the same as the domain name of the access request.

15. The server according to claim 13, wherein, the at least one processor further implement the following steps before obtaining a response content corresponding to the access request from a source station according to a URL of the access request:
- determining if a domain name of the access request is in a preset first domain name list; and
- if the domain name of the access request is in the preset first domain name list, performing the step of obtaining a response content corresponding to the access request from a source station according to a URL of the access request.

16. The server according to claim 12, wherein, the at least one processor further implement the following steps before obtaining a response content corresponding to the access request from a source station according to a URL of the access request:
- determining if a domain name of the access request is in a preset first domain name list; and
- if the domain name of the access request is in the preset first domain name list, performing the step of obtaining a response content corresponding to the access request from a source station according to a URL of the access request.

17. The server according to claim 12, wherein,
the adjusting domain names of at least two sub-resource requests in the response content to be a same domain name of a preset protocol type further comprises: recording current URLs of the sub-resource requests, and establishing a correspondence between original URL and the current URL of each of the sub-resource requests; and
the restoring, when receiving a sub-resource request having the same domain name sent by the client terminal, the domain name of the sub-resource request to an original domain name of the sub-resource request comprises:
- when receiving the sub-resource request sent by the client terminal, determining if the domain name of the sub-resource request is the same domain name according to the correspondence between the original URL and the current URL of the sub-resource request; and
- if the domain name of the sub-resource request is the same domain name, restoring the domain name of the sub-resource request to the original domain name of the sub-resource request.

18. The server according to claim 12, wherein the adjusting domain names of at least two sub-resources in the response content to be a same domain name of a preset protocol type comprises:
- adjusting the domain names of all the sub-resource requests in the response content to be the same domain name of the preset protocol type.

19. The server according to claim 12, wherein the adjusting domain names of at least two sub-resources in the response content to be a same domain name of a preset protocol type comprises:
- adjusting, according to a preset second domain name list, the domain names of the sub-resource requests in the response content and presented in the second domain name list to be the same domain name of the preset protocol type.

20. The server according to claim 12, wherein the preset protocol type is a HTTP2 protocol.

* * * * *

UNITED STATES PATENT AND TRADEMARK OFFICE
CERTIFICATE OF CORRECTION

PATENT NO. : 10,826,870 B2
APPLICATION NO. : 16/564027
DATED : November 3, 2020
INVENTOR(S) : Wang et al.

Page 1 of 1

It is certified that error appears in the above-identified patent and that said Letters Patent is hereby corrected as shown below:

On the Title Page

In the Foreign Application Priority Data item (30): Delete "May 8, 2019" and insert
-- March 21, 2019 --

Signed and Sealed this
Twenty-second Day of December, 2020

Andrei Iancu
*Director of the United States Patent and Trademark Office*